US009981508B2

(12) United States Patent
Takemoto

(10) Patent No.: US 9,981,508 B2
(45) Date of Patent: May 29, 2018

(54) PNEUMATIC TIRE

(71) Applicant: SUMITOMO RUBBER INDUSTRIES, LTD., Kobe-shi, Hyogo (JP)

(72) Inventor: Yoshiaki Takemoto, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 72 days.

(21) Appl. No.: 14/916,500

(22) PCT Filed: Sep. 3, 2014

(86) PCT No.: PCT/JP2014/073211
§ 371 (c)(1),
(2) Date: Mar. 3, 2016

(87) PCT Pub. No.: WO2015/045764
PCT Pub. Date: Apr. 2, 2015

(65) Prior Publication Data
US 2016/0193884 A1 Jul. 7, 2016

(30) Foreign Application Priority Data

Sep. 25, 2013 (JP) ................................. 2013-198781

(51) Int. Cl.
*B60C 11/12* (2006.01)
*B60C 11/03* (2006.01)
*B60C 11/13* (2006.01)

(52) U.S. Cl.
CPC ...... *B60C 11/1236* (2013.01); *B60C 11/0304* (2013.01); *B60C 11/0306* (2013.01);
(Continued)

(58) Field of Classification Search
CPC ..... B60C 2011/1245; B60C 2011/1254; B60C 11/1281
See application file for complete search history.

(56) References Cited

U.S. PATENT DOCUMENTS

2009/0218020 A1*  9/2009  Sumi .................. B60C 11/12
                                                152/209.18
2011/0024012 A1*  2/2011  Iwai .................. B60C 11/0306
                                                152/209.27
(Continued)

FOREIGN PATENT DOCUMENTS

EP   0 753 418 A1   1/1997
EP   2 610 085 A1   7/2013
(Continued)

OTHER PUBLICATIONS

International Search Report issued in PCT/JP2014/073211 dated Dec. 2, 2014.
(Continued)

*Primary Examiner* — Joseph S Del Sole
*Assistant Examiner* — Cedrick S Williams
(74) *Attorney, Agent, or Firm* — Birch, Stewart, Kolasch & Birch, LLP

(57) ABSTRACT

It is a pneumatic tire 1 which is provided with a pair of shoulder land portions 4A defined between shoulder main grooves 3A and tread edges 2t by having the grooves 3A. At least one of the shoulder land portions 4A is provided with a plurality of shoulder lug grooves 5 and a plurality of shoulder sipes 6. The shoulder lug grooves 5 include first shoulder lug grooves 5A extending axially inward from the tread edge 2t and terminating without reaching the shoulder main groove 3A. The shoulder sipes 6 include first shoulder sipes 6A extending axially inward from the axially inner ends 5Ai of the first shoulder lug grooves 5A and connected to the shoulder main groove 3A, and second shoulder sipes 6B intersecting the first shoulder sipes 6A and extending in the tire circumferential direction.

6 Claims, 7 Drawing Sheets

(52) U.S. Cl.
CPC ...... *B60C 11/0327* (2013.01); *B60C 11/1281* (2013.01); *B60C 11/1307* (2013.01); *B60C 11/1392* (2013.01); *B60C 2011/039* (2013.01); *B60C 2011/0334* (2013.01); *B60C 2011/0341* (2013.01); *B60C 2011/0358* (2013.01); *B60C 2011/0381* (2013.01); *B60C 2011/0388* (2013.01); *B60C 2011/1209* (2013.01); *B60C 2011/1245* (2013.01); *B60C 2011/1254* (2013.01)

(56) References Cited

U.S. PATENT DOCUMENTS

| | | | |
|---|---|---|---|
| 2012/0118455 A1* | 5/2012 | Hada | B60C 11/0304 152/209.8 |
| 2012/0291934 A1 | 11/2012 | Iwabuchi | |
| 2013/0167996 A1 | 7/2013 | Oda | |

FOREIGN PATENT DOCUMENTS

| | | | | | |
|---|---|---|---|---|---|
| JP | 02200503 | A | * | 8/1990 | ......... B60C 11/1263 |
| JP | 7-40711 | A | | 2/1995 | |
| JP | 2006-123609 | A | | 5/2006 | |
| JP | 2006123609 | A | * | 5/2006 | |
| JP | 2006123609 | A | * | 5/2006 | |
| JP | 2009-29249 | A | | 2/2009 | |
| JP | 2011-63193 | A | | 3/2011 | |
| JP | 2012-140091 | A | | 7/2012 | |
| JP | 2013-139194 | A | | 7/2013 | |

OTHER PUBLICATIONS

Written Opinion of the International Searching Authority issued in PCT/JP2014/073211 dated Dec. 2, 2014.
Extended European Search Report dated Jun. 12, 2017, in European Patent Application No. 14849741.5.

* cited by examiner

PNEUMATIC TIRE

TECHNICAL FIELD

The present invention relates to a pneumatic tire capable of improving uneven wear resistance, while maintaining steering stability.

BACKGROUND ART

Heretofore, there has been proposed a pneumatic tire in which a shoulder land portion defined between a shoulder main groove and a tread edge is provided with a shoulder lug groove extending from the tread edge toward the inside in the tire axial direction and terminating without reaching the shoulder main groove (for example, see Patent Document 1). Such pneumatic tire can improve the steering stability because it is possible to increase the circumferential rigidity of the shoulder land portion.

PRIOR ART DOCUMENTS

Patent Document

Patent Document 1: JP 2013-139194

SUMMARY OF THE INVENTION

Problems to be Solved by the Invention

However, the shoulder land portion as described above becomes relatively high in the rigidity on the side of the axially inner end of the shoulder lug groove, and a large difference in the rigidity is easily caused in the tire axial direction. Accordingly, the entire region in the tire axial direction of the shoulder land portion becomes not possible to flexibly follow the road surface, and slip tends to occur between the shoulder land portion and the road surface. Such slip has a problem that uneven wear easily occurs in the shoulder land portion.

The present invention was made in view of the circumstances as described above, and a primary objective is to provide a pneumatic tire in which the uneven wear resistance can be improved, while maintaining the steering stability, essentially by providing in a shoulder land portion with a first shoulder sipe which extends axially inwardly from an axially inner end of a first shoulder lug groove and communicates with a shoulder main groove, and a second shoulder sipe which intersects with the first shoulder sipe and extends in the tire circumferential direction.

Means for Solving the Problems

The present invention is a pneumatic tire provided in the tread portion with a pair of shoulder main grooves extending continuously in the tire circumferential direction in most tread edge sides to thereby have a pair of shoulder land portions defined between the shoulder main grooves and the tread edges, and characterized in that at least one of the shoulder land portions is provided with a plurality of shoulder lug grooves and a plurality of shoulder sipes, the shoulder lug grooves extend axially inwardly from the tread edge, and include first shoulder lug grooves which terminate without reaching the shoulder main groove, the shoulder sipes include first shoulder sipes which extend axially inwardly from axially inner ends of the first shoulder lug grooves and communicate with the shoulder main groove, and second shoulder sipes which intersect with the first shoulder sipes and extend in the tire circumferential direction.

In the pneumatic tire according to the present invention, it is preferable that the first shoulder lug grooves are spaced apart from each other in the tire circumferential direction, the shoulder lug grooves include second shoulder lug grooves which are disposed one between a pair of the circumferentially adjacent first shoulder lug grooves, and ends of the second shoulder sipes on one side in the tire circumferential direction are connected to axially inner ends of the second shoulder lug grooves.

In the pneumatic tire according to the present invention, it is preferable that ends of the second shoulder sipes on the other side in the tire circumferential direction are provided with bulge portions in which the second shoulder sipes are increased in the width.

In the pneumatic tire according to the present invention, it is preferable that the shoulder sipes include third shoulder sipes which extend in the tire axial direction between the first shoulder lug grooves and the second shoulder lug grooves, and axially inner ends of the third shoulder sipes terminate without reaching the second shoulder sipes.

In the pneumatic tire according to the present invention, it is preferable that external corners between groove walls of the shoulder lug grooves and a tread surface in the shoulder land portion are provided with chamfers.

In this specification, unless otherwise noted, dimensions of various portions of the tire are values determined under a normal state mounted on a normal rim and inflated to a normal internal pressure.

The "normal rim" is a rim specified for the tire in a standard included in a standard system on which the tire is based, and for example, it means "standard rim" in JATMA, "Design Rim" in TRA, and "Measuring Rim" in ETRTO.

The "normal internal pressure" is an air pressure specified for the tire in the above-mentioned standard, the maximum air pressure in JATMA, the maximum value described in the table "TIRE LOAD LIMITS AT VARIOUS COLD INFLATION PRESSURES" in TRA, the "INFLATION PRESSURE" in ETRTO. However, in the case of tires for passenger cars, it is uniformly defined as 180 kPa.

Effect of the Invention

The pneumatic tire according to the present invention is provided in the tread portion with a pair of the shoulder main grooves extending continuously in the tire circumferential direction in most tread edge sides to thereby have a pair of the shoulder land portions defined between the shoulder main grooves and the tread edges. At least one of the shoulder land portions is provided with a plurality of the shoulder lug grooves and a plurality of the shoulder sipes.

The shoulder lug grooves extend axially inwardly from the tread edges, and include the first shoulder lug grooves which terminate without reaching the shoulder main grooves. Such first shoulder lug grooves can increase the circumferential rigidity of the shoulder land portion, while maintaining the drainage performance. Therefore, the pneumatic tire according to the present invention can improve the steering stability.

The shoulder sipes include the first shoulder sipes which extend axially inwardly from the axially inner ends of the first shoulder lug grooves and communicate with the shoulder main grooves, and the second shoulder sipes which intersect with the first shoulder sipes and extend in the tire circumferential direction.

In the regions between the shoulder main grooves and the inner ends of the first shoulder lug grooves, the first shoulder sipes and the second shoulder sipes can effectively deform the shoulder land portion and further mitigate the rigidity. The regions between the inner ends of the first shoulder lug grooves and the shoulder main grooves is such a region where the rigidity of the shoulder land portion becomes relatively high. Accordingly, the shoulder land portion becomes smaller in the rigidity difference in the tire axial direction, and becomes possible to flexibly follow the road surface, therefore, it is possible to effectively prevent the occurrence of slip between the shoulder land portion and the road surface.

Therefore, the pneumatic tire according to the present invention can improve the uneven wear resistance, while maintaining the steering stability.

MODE FOR CARRYING OUT THE INVENTION

Hereinafter, an embodiment of the present invention will be described with reference to the drawings.

Figure 1:
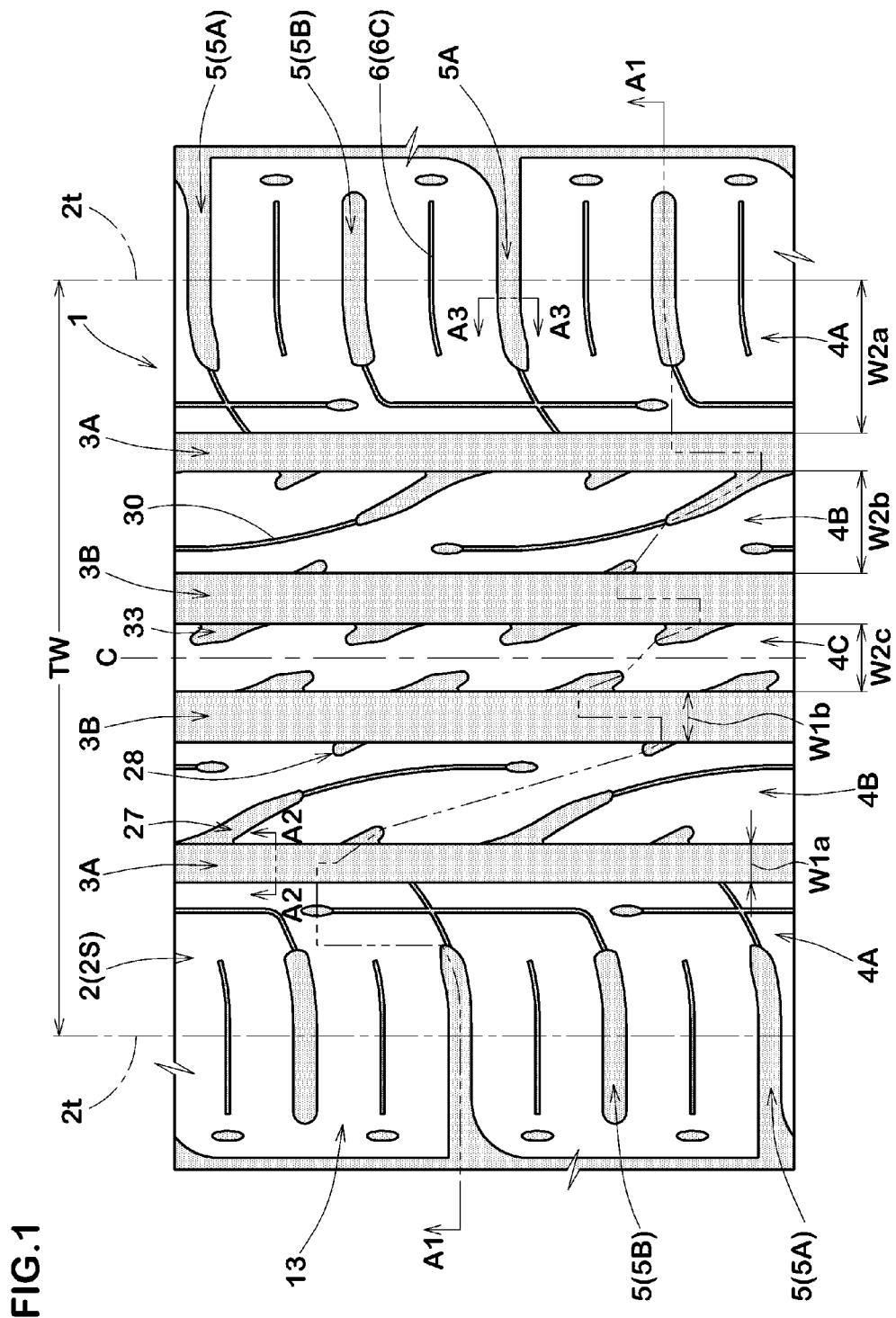
FIG. 1 a developed view showing an example of a tread portion of a pneumatic tire as an embodiment FIG. 2 an A1-A1 sectional view of FIG. 1

FIG. 1 is a developed view showing an example of a tread portion of a pneumatic tire 1 as an embodiment (hereinafter, sometimes simply referred to as "tire").

Figure 2:
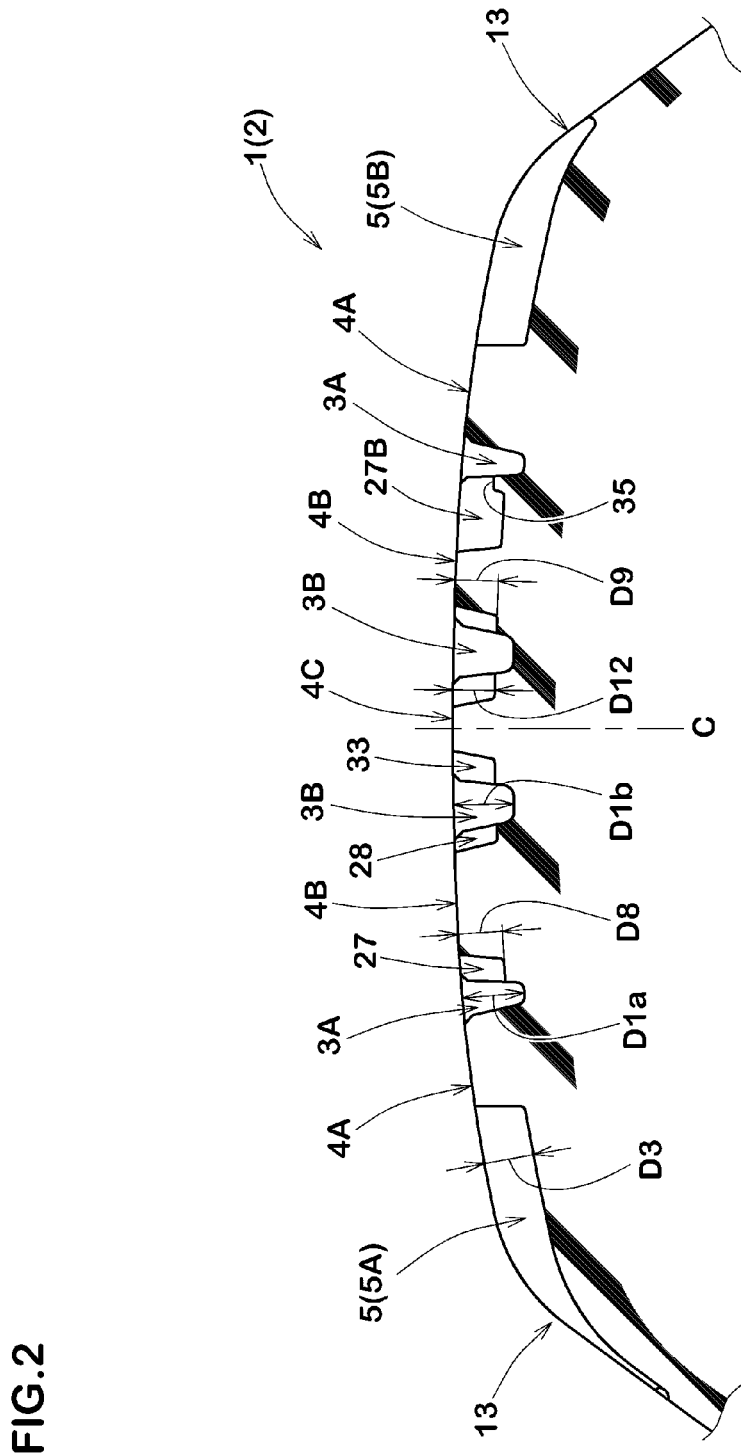

FIG. 2 is an A1-A1 sectional view of FIG. 1.

The tire 1 in this embodiment is constructed as a passenger car tire.

The tread portion 2 in this embodiment is formed with a tread pattern of a point symmetry about any point on the tire equator C.

The tread portion 2 is provided with a pair of shoulder main grooves 3A, 3A extending continuously in the tire circumferential direction in most tread edge 2t sides, and a pair of center main grooves 3B, 3B extending continuously in the tire circumferential direction on both sides of the tire equator c and axially inside the shoulder main grooves 3A. Thereby, the tread portion 2 is provided with a pair of shoulder land portions 4A, 4A defined between the shoulder main grooves 3A and the tread edges 2t, a pair of middle land portions 4B, 4B defined between the center main grooves 3B and the shoulder main grooves 3A, and a center land portion 4C defined between a pair of the center main grooves 3B, 3B.

"Tread edge 2t" is an edge on the exterior if identifiable as a clear edge. If not identifiable, the tread edge 2t is defined by the axially outermost ground contacting edge when the tread portion 2 of the tire 1 under the above-mentioned normal state which is loaded with a normal load is contacted with a plane at a camber angle of 0 degree.

The "normal load" is a load specified for the tire in a standard included in a standard system on which the tire is based, the maximum load capacity in JATMA, the maximum value described in the table "TIRE LOAD LIMITS AT VARIOUS COLD INFLATION PRESSURES" in TRA, the "LOAD CAPACITY" in ETRTO. However, in the case of tires for passenger cars, it is defined as 88% of the above-mentioned load.

The shoulder main grooves 3A and the center main grooves 3B are formed as straight grooves extending straight along the tire circumferential direction. Such straight grooves can smoothly discharge water film between the tread surface 2S of the tread portion 2 and the road surface toward the tire circumferential direction. Accordingly, the tire 1 can be improved in the drainage performance.

It is desirable that the respective groove widths W1a, W1b of the shoulder main grooves 3A and the center main grooves 3B are about 8.0% to about 15.0% of the tread width TW which is the distance in the tire axial direction between the tread edges 2t, 2t.

Further, it is desirable that the groove depths D1a, D1b (shown in FIG. 2) of the shoulder main grooves 3A and the center main grooves 3B are about 6.0 mm to about 10.0 mm.

Figure 3:
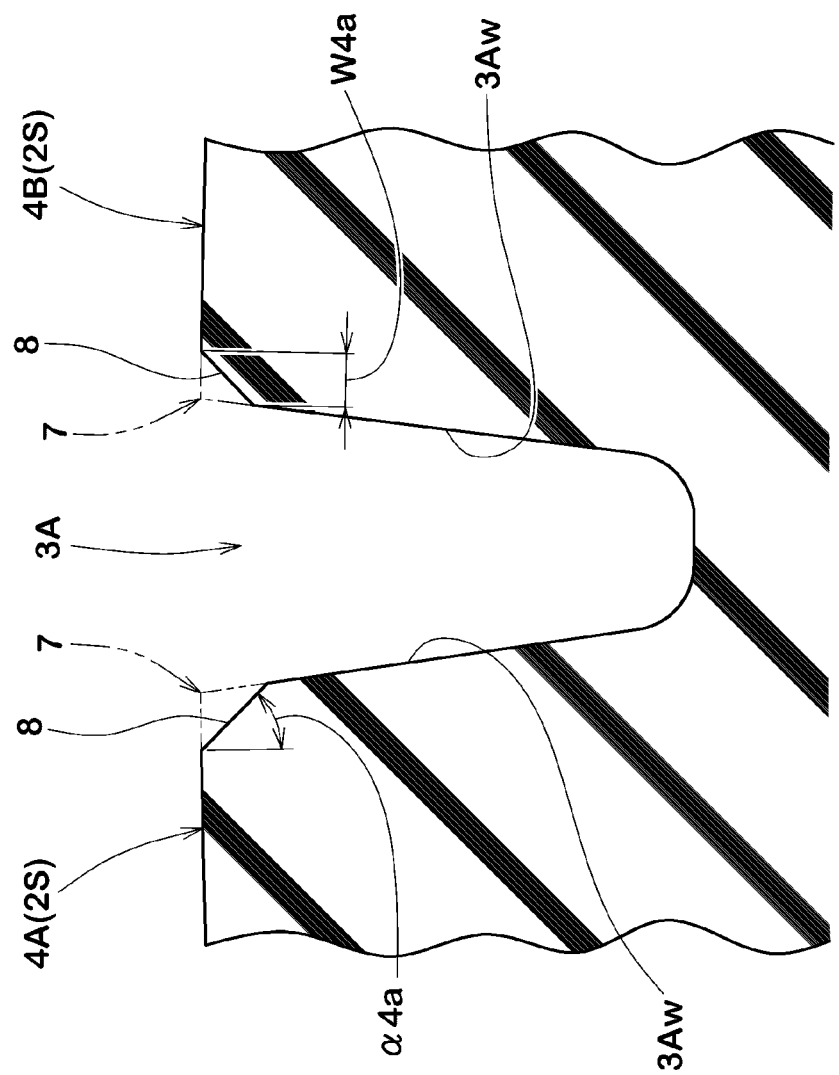
FIG. 3 an A2-A2 sectional view of FIG. 1

FIG. 3 is an A2-A2 sectional view of FIG. 1.

The corner 7 between the tread surface 2S in the shoulder land portion 4A and the groove wall 3Aw of the shoulder main groove 3A is preferably provided with a chamfer 8.

In addition, the corner 7 between the tread surface 2s in the middle land portion 4B and the groove wall 3Aw of the shoulder main groove 3A is preferably provided with a chamfer 8.

Such chamfer 8 can prevent damage such as chipping likely occurring in the corner 7, and uneven wear of the shoulder land portion 4A and middle land portion 4B.

In order to effectively bring out such effects, the angle $co1a$ of the chamfer 8 with respect to the tire radial direction is preferably about 30 degrees to about 60 degrees.

Further, the width W4a of the chamfer 8 is preferably about 0.5 mm to about 1.5 mm.

Further, the corner (not shown) between the groove wall (not shown) of the center main groove 3B and the tread surface 2S in the middle land portion 4B is preferably provided with a chamfer (not shown).

In addition, the corner (not shown) between the tread surface 2s in the center land portion 4C and the groove wall of the center main groove 3B is preferably provided with a chamfer (not shown). Such chamfer also can prevent damage such as chipping likely occurring in the corner, and uneven wear of the middle land portion 4B and the center land portion 4C.

As shown in FIG. 1, the shoulder land portions 4A are formed as straight ribs extending straight in the tire circumferential direction. Such shoulder land portions 4A can be increased in the circumferential rigidity, and help to improve the steering stability and the straight running stability performance.

Preferably, the maximum width W2a in the tire axial direction of the shoulder land portion 4A is about 18% to about 23.0% of the tread width TW.

At least one of the shoulder land portions 4A is provided with a plurality of shoulder lug grooves 5 and a plurality of shoulder sipes 6. In this embodiment, a plurality of the shoulder lug grooves 5 and a plurality of the shoulder sipes 6 are disposed in each of the shoulder land portions 4A, 4A.

Figure 4:
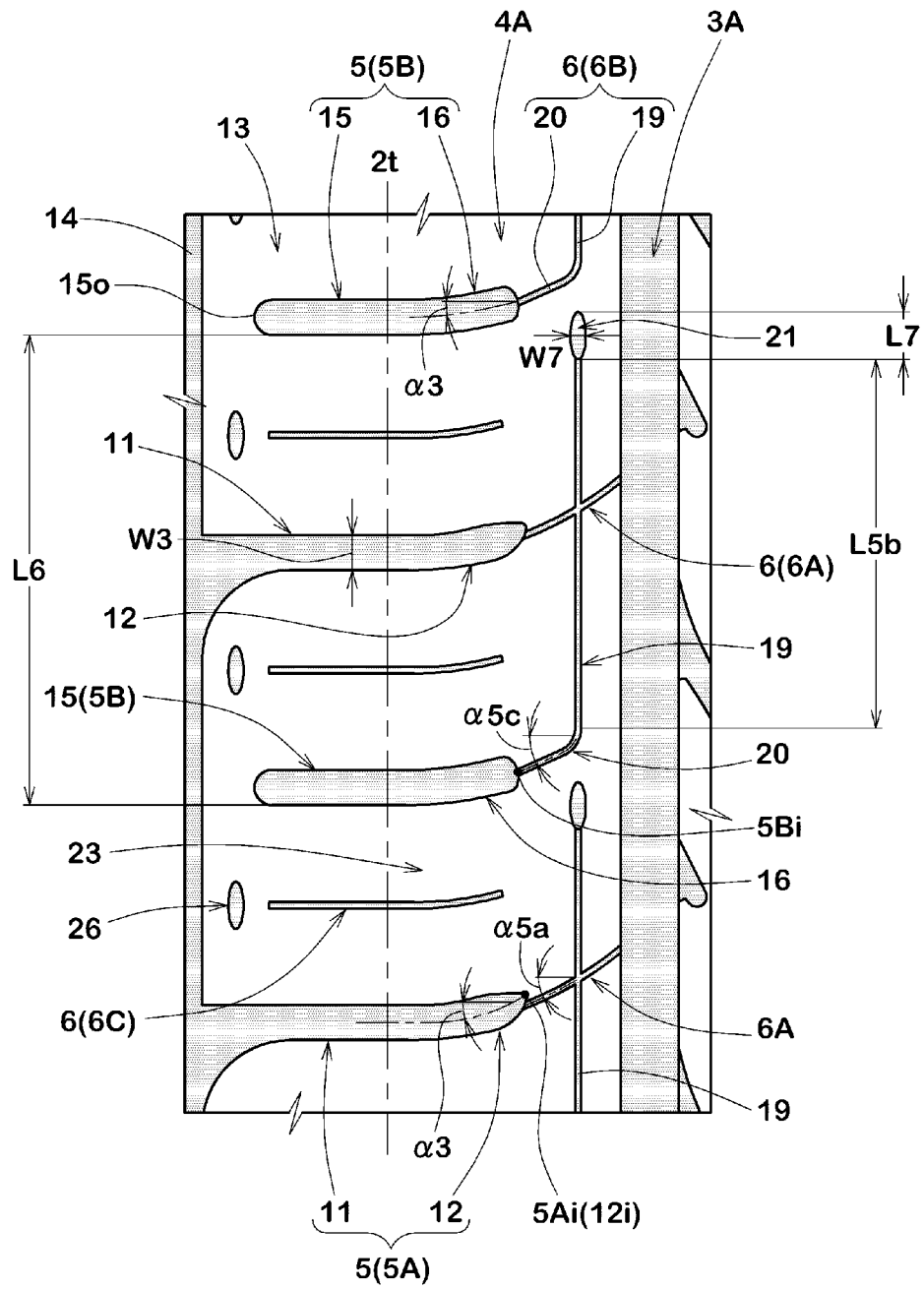
FIG. 4 a developed view enlargedly showing the shoulder land portion

FIG. 4 is a developed view enlargedly showing the shoulder land portion 4A.

The shoulder lug grooves 5 extend toward the axially inside from the tread edge 2t, and are terminated without reaching the shoulder main groove 3A. Such shoulder lug grooves 5 can smoothly discharge water film between the tread surface 2S in the shoulder land portion 4A and the road surface toward the tread edge 2t, while preventing the shoulder land portion 4A from being decreased in the rigidity. Therefore, the shoulder lug grooves 5 help to improve the steering stability and drainage performance.

In addition, it is desirable that the groove width W3 of the shoulder lug grooves 5 is about 2.5% to about 8.5% of the tread width TW (shown in FIG. 1).

Further, it is preferred that the groove depth D3 (shown in FIG. 2) of the shoulder lug grooves 5 is about 6.0 mm to about 10.0 mm.

Figure 5:
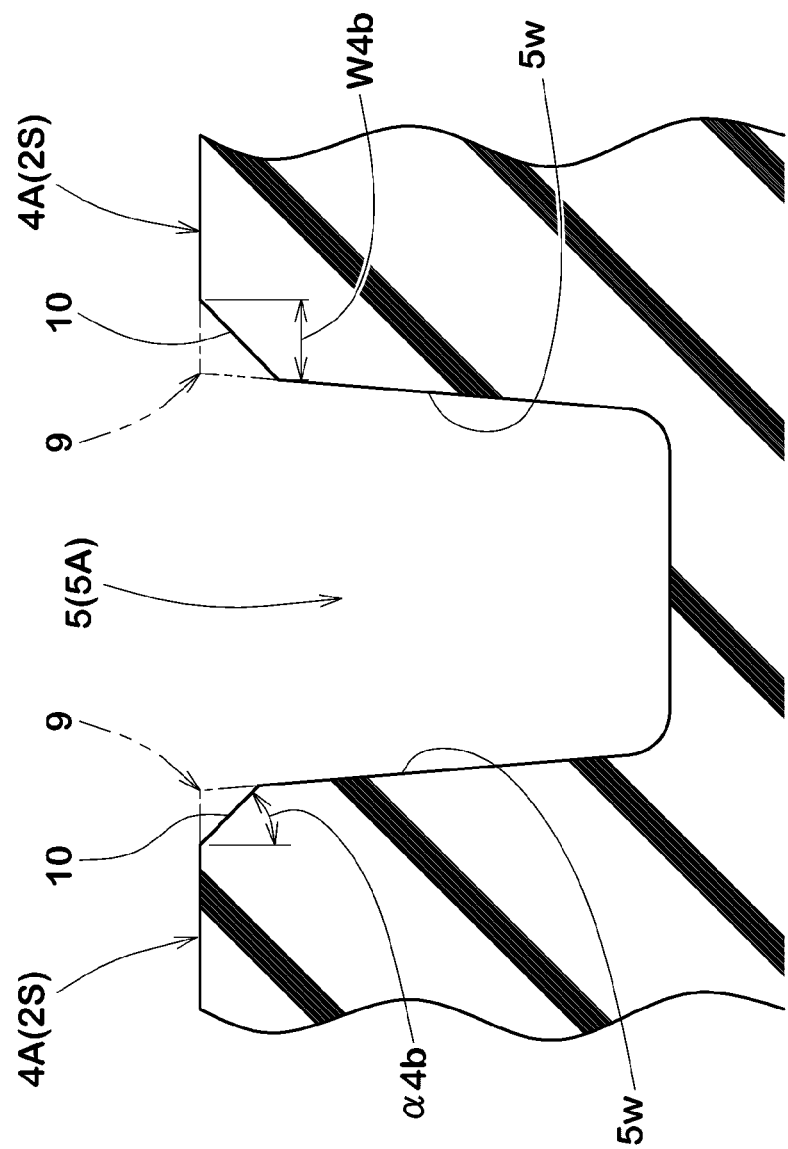
FIG. 5 an A3-A3 sectional view of FIG. 1

FIG. 5 is an A3-A3 sectional view of FIG. 1.

It is preferable that the corner 9 between the tread surface 2S in the shoulder land portion 4A and the groove wall 5W of the shoulder lug grooves 5 is provided with a chamfer 10. Such chamfer 10 can prevent damage such as chipping likely occurring in the corner 9, and uneven wear of the shoulder land portion 4A. It is preferable that the angle α4b of the chamfer 10 with respect to the tire radial direction is set in the same range as the angle α4a of the chamfer 8 shown in FIG. 3.

Further, it is preferable that the width W4b of the chamfer 10 is set in the same range as the width W4a of the chamfer 8 shown in FIG. 3.

As shown in FIG. 1, the shoulder lug grooves 5 in this embodiment include first shoulder lug grooves 5A arranged at intervals in the tire circumferential direction, and second shoulder lug grooves 5B disposed one between two circumferentially adjacent first shoulder lug grooves 5A, 5A. The first shoulder lug grooves 5A and the second shoulder lug grooves 5B are arranged alternately in the tire circumferential direction.

As shown in FIG. 4, the first shoulder lug groove 5A comprises an outer part 11 which is disposed across the tread edge 2t, and an inner part 12 which is disposed axially inside the outer part 11.

The outer part 11 extends in a tire axial direction at an angle α3 of 0 to 5 degrees with respect to the tire axial direction. Such outer part 11 can increase the rigidity of the shoulder land portion 4A, for example, in comparison with that formed with a larger angle α3 (for example, over 15 degrees). Accordingly, the tire 1 can improve the steering stability.

The outer part 11 in this embodiment extends toward the axially outside from the axially outer end of the inner part 12, and extends beyond the tread edge 2t toward a buttress portion 13. In the buttress portion 13, the groove width W3 of the outer part 11 is gradually increased toward the axially outer side from the tread edge 2t side. Such outer part 11 can mitigate the rigidity of the buttress portion 13, and can increase the followability to a road surface of the shoulder land portion 4A on the tread edge 2t side. Accordingly, it is possible to suppress the slip between the road surface and the shoulder land portion 4A on the tread edge 2t side, and the uneven wear resistance and wear resistance can be improved. Further, as the outer part 11 mitigate the rigidity of the buttress portion 13, the ride comfort can be improved.

The maximum value for the groove width W3 of the outer part 11 in the buttress portion 13 is preferably about 4.0% to about 8.0% of the tread width TW (shown in FIG. 1).

In the buttress portion 13, the axially outer ends of the axially outer portions 11, 11 adjacent in the tire circumferential direction, are connected by connecting grooves 14 extending in the tire circumferential direction. Such connecting grooves 14 can be effectively mitigate the rigidity of the buttress portion 13. Therefore, the connecting grooves 14 help to increase the followability to the road surface of the shoulder land portion 4A on the tread edge 2t side.

The Inner part 12 extends while inclining with respect to the tire axial direction at a larger angle α3 than the outer part 11. Such inner part 12 can smoothly guide water film between the tread surface 2s in the shoulder land portion 4A and the road surface to the outer part 11.

It is preferable that the angle α3 of the inner part 12 is about 5 degrees to about 10 degrees.

The inner part 12 extends from the outer part 11 side towards the axially inner end 12i in a tapered manner. Such inner part 12 can prevent the shoulder land portion 4A from being decreased in the rigidity in an axially inside of the shoulder land portion 4A and can improve the steering stability.

Similarly to the first shoulder lug groove 5A, the second shoulder lug groove 5B comprises an outer part 15 extending across the tread edge 2t and an inner part 16 disposed at the inner end of the axially outer part 15.

Similarly to the outer part 11 of the first shoulder lug groove 5A, the outer part 15 extends in the tire axial direction at an angle α3 of 0 degrees to 5 degrees with respect to the tire axial direction. Such outer part 15 also prevents the shoulder land portion 4A from being decreased in the rigidity and helps to improve the steering stability.

Similarly to the outer part 11 of the first shoulder lug groove 5A, the outer part 15 extends toward the axially outside from the axially outer end of the axially inner part 16 and extends beyond the tread edge 2t into the buttress portion 13. Further, the axially outer end 15o of the outer part 15 terminates on the axially inside of the outer end of the outer part 11 of the first shoulder lug groove 5A.

Thus, the outer end 15o of the outer part 15 terminates without reaching the connecting groove 14.

Such outer part 15 can prevent the rigidity of the shoulder land portion 4A from being excessively decreased, and can maintain the steering stability.

Similarly to the inner part 12 of the first shoulder lug groove 5A, the inner part 16 extends while inclining with respect to the tire axial direction at a larger angle α3 than the outer part 15. Also such inner part 16 can smoothly guide water film between the tread surface 2s in the shoulder land portion 4A and the road surface to the outer part 15.

The shoulder sipes 6 in this embodiment include first shoulder sipes 6A, second shoulder sipes 6B, and third shoulder sipes 6C.

The first shoulder sipe 6A extends toward the axially inside from the axially inner end 5Ai of the first shoulder lug groove 5A, and communicates with the shoulder main groove 3A. Such first shoulder sipe 6A can mitigate the rigidity of the shoulder land portion 4A in the area between the inner end 5Ai of the first shoulder lug groove 5A and the shoulder main groove 3A. The area between the inner end 5Ai of the first shoulder lug groove 5A and the shoulder main groove 3A is an area where the rigidity of the shoulder land portion 4A is relatively high. Thereby, the first shoulder sipe 6A can reduce the rigidity difference in the tire axial direction of the shoulder land portion 4A, and can improve the followability to road surface of the shoulder land portion 4A.

Accordingly, the first shoulder sipe 6A helps to improve the uneven wear resistance, the wear resistance and the ride comfort. The depth (not shown) of the first shoulder sipe 6A is preferably about 4.0 mm to about 8.0 mm.

The first shoulder sipe 6A is inclined with respect to the tire axial direction. Therefore, the first shoulder sipe 6A can increase edge components in the tire axial direction and the tire circumferential direction, and helps to improve the steering stability.

Furthermore, it is preferable that the angle $\alpha 5a$ with respect to the tire axial direction of the first shoulder sipe 6A is gradually increased from the axial outside to the axially inside. Between the inner end 5Ai of the first shoulder lug groove 5A and the shoulder main groove 3A, such first shoulder sipe 6A can smoothen the rigidity change of the shoulder land portion 4A, and it can improve the steering stability. Preferably, the angle $\alpha 5a$ of the first shoulder sipe 6A is 10 degrees to 30 degrees.

The second shoulder sipe 6B comprises a first part 19 extending in the tire circumferential direction. Such first part 19 can increase the edge component in the tire axial direction, and helps to improve the steering stability.

The first part 19 intersects the first shoulder sipe 6A in a substantially cross shape.

In the region between the inner end 5Ai of the first shoulder lug groove 5A and the shoulder main groove 3A, such second shoulder sipe 6B together with the first shoulder sipe 6A can allow the shoulder land portion 4A to be deformed, and it is possible to effectively mitigate the rigid thereof. Thereby, the first part 19 can reliably reduce a rigidity difference in the tire axial direction of the shoulder land portion 4A, and helps to effectively increase the followability to road surface of the shoulder land portion 4A. Accordingly, the shoulder land portion 4A can effectively prevent the slippage occurring on the road surface, and can improve the uneven wear resistance, the wear resistance and the ride comfort.

In order to effectively derive such effect, the circumferential length L5b of the first part 19 is preferably set to 80% to 95% of the circumferential length L6 between a pair of the second shoulder lug grooves 5B, 5B which are adjacent to each other in the tire circumferentially direction. If the length L5b of the first part 19 is less than 80% of the length L6 between the second shoulder lug grooves 5B, 5B, then the rigidity difference in the tire axial direction of the shoulder land portion 4A can not be sufficiently decreased, and there is a possibility that the uneven wear resistance, the wear resistance and the ride comfort are deteriorated. On the contrary, if the length L5b of the first part 19 is more than 95% of the length L6 between the second shoulder lug groove 5B, 5B, then the rigidity of the shoulder land portion 4A is excessively decreased, and there is a possibility that the steering stability can not be maintained. From this point of view, the length L5 of the first part 19 is more preferably not less than 85% and more preferably not more than 92% of the length L6 between the second shoulder lug grooves 5B, 5B.

From the same point of view, the depth (not shown) of the first part 19 is preferably 0.5 mm or more, more preferably 0.8 mm or more, but preferably 1.5 mm or less, more preferably 1.2 mm or less.

The second shoulder sipe 6B in this embodiment comprises a second part 20 which communicates between one end in the tire circumferential direction of the first part 19 and the inner end 5Bi of the second shoulder lug groove 5B. In the area between the inner end 5Bi of the second shoulder lug grooves 5B and the shoulder main groove 3A, the second part 20 can mitigate the rigidity of the shoulder land portion 4A. Thereby, together with the first shoulder sipe 6A and the first part 19, the second part 20 can reduce the rigidity difference in the tire axial direction of the shoulder land portion 4A, and helps to improve the followability to road surface of the shoulder land portion 4A.

Accordingly, the shoulder land portion 4A can effectively prevent the occurrence of slippage between the shoulder land portion and the road surface, and can improve the uneven wear resistance and the wear resistance.

It is preferable that the depth (not shown) of the second part 20 is in the same range as the first part 19.

It is preferable that, between one end of the first part 19 and the inner end 20i of the second shoulder lug groove 5B, the second part 20 extends and curves while gradually decreasing the angle $\alpha 5c$ with respect to the tire axial direction. Such second part 20 can smoothen the rigidity variation between one end of the first part 19 and the inner end 5Bi of the second shoulder lug groove 5B, and can improve the steering stability.

The other end in the tire circumferential direction of the first part 19 of the second shoulder sipe 6B is provided with a bulge portion 21 in which the axial width of the second shoulder sipe 6B is increased.

In this embodiment, the bulge portion 21 is formed in a vertically long elliptical shape in which the maximum length L7 in the tire circumferential direction is larger than the maximum width W7 in the tire axial direction.

Such bulge portion 21 can effectively reduce the rigidity of the shoulder land portion 4A, and helps to improve the followability to road surface of the shoulder land portion 4A. Accordingly, the bulge portion 21 helps to improve the uneven wear performance, the wear resistance and the ride comfort.

In order to effectively derive such effect, it is preferable that the maximum width W7 of the bulge portion 21 is 1.0 mm to 2.0 mm. Further, it is preferable that the maximum length L7 of the bulge 21 is 5.0 mm to 6.0 mm. Furthermore, it is preferable that the depth (not shown) of the bulge portion 21 is 0.6 mm to 1.5 mm.

In this embodiment, the bulge portion 21 is disposed axially inside the second shoulder lug groove 5B.

In the area between the inner end 5Bi of the second shoulder lug grooves 5B and the shoulder main groove 3A, such bulge portion 21 together with the second part 20 can mitigate the rigidity of the shoulder land portion 4A.

The third shoulder sipe 6c extends in the tire axial direction between the first shoulder lug groove 5A and the second shoulder lug groove 5B.

Further, the axially outer end of the third shoulder sipe 6c is disposed in the buttress portion 13 beyond the tread edge 2t. Such third shoulder sipe 6c can effectively mitigate the rigidity of a block-shaped portion 23 divided by the first shoulder lug groove 5A and the second shoulder lug groove 5B. Thereby, the shoulder land portion 4A is reduced in the rigidity difference in the tire circumferential direction, and can be improved in the followability to road surface.

Accordingly, the tire 1 can be improved in the uneven wear resistance, the wear resistance and the ride comfort.

Preferably, the depth (not shown) of the third shoulder sipe 6c is 1.0 mm to 6.0 mm.

The axially inner end of the third shoulder sipe 6c is terminated without reaching the second shoulder sipes 6B.

Thereby, the third shoulder sipe 6C can be prevented from being excessively reduced in the rigidity of the shoulder land portion 4A, and can maintain the steering stability.

The buttress portion 13 is provided on the axially outside of the third shoulder sipe 6c with concave portions 26 recessed radially inwardly of the tire.
In this embodiment, the concave portion 26 is formed in the same shape as the bulge 21.

Between the first shoulder lug groove 5A and the second shoulder lug groove 5B which are adjacent to each other in the tire circumferential direction, such concave portion 26 can reduce the rigidity of the buttress portion 13, and can increase the followability to road surface of the shoulder land portion 4A. Therefore, the concave portion 26 can improve the uneven wear resistance, the wear performance and the ride comfort.

As shown in FIG. 1, the middle land portion 4B is formed as a straight rib extending straight in the tire circumferential direction. Such middle land portion 4B can increase the circumferential rigidity, and helps to improve the steering stability and the straight running stability performance.
It is preferable that the maximum axial width W2b of the middle land portion 4B is about 10.0% to about 17.0% of the tread width TW.

At least one of the middle land portions 4B is provided with outer middle lug grooves 27 and inner middle lug grooves 28. In this embodiment, the outer middle lug grooves 27 and the inner middle lug grooves 28 are provided in each of a pair of the middle land portions 4B, 4B.
Further, the middle land portion 4B is provided with at least one, in this embodiment a plurality of middle sipes 30.

Figure 6:
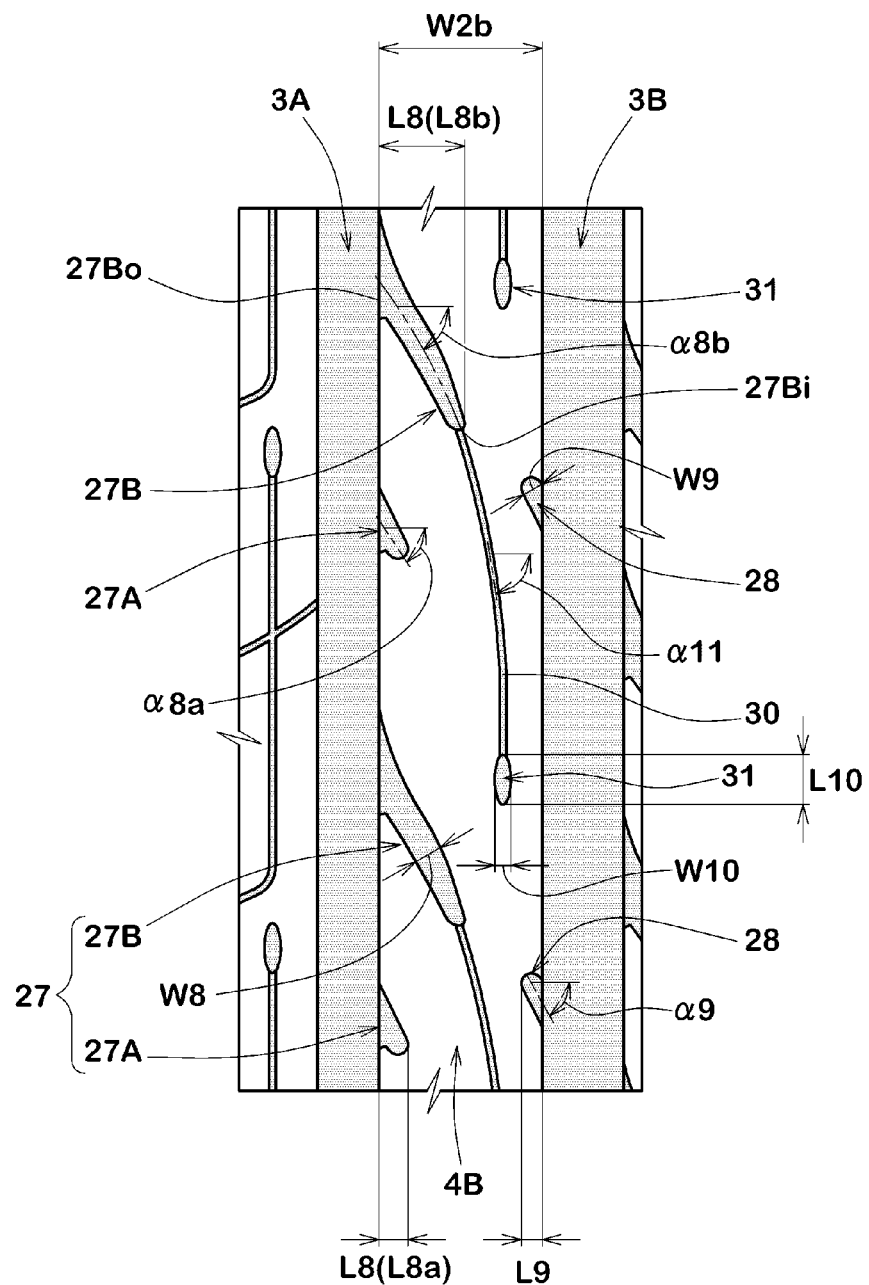
FIG. 6 a developed view enlargedly showing a middle land portion

FIG. 6 is a developed view enlargedly showing the middle land portion 4B.
The outer middle lug groove 27 extends toward the axially inside from the shoulder main groove 3A, and terminates without reaching the center main groove 3B. Such outer middle lug groove 27 can smoothly discharge water film between the road surface and the tread surface 2S in the middle land portion 4B (shown in FIG. 2), toward the shoulder main groove 3A, while preventing the middle land portion 4B from being decreased in the rigidity. Therefore, the outer middle lug groove 27 helps to improve the steering stability and drainage performance. It is preferable that the groove width W8 of the outer middle lug groove 27 is about 2.0% to about 4.0% of the tread width TW (shown in FIG. 1). Also, it is preferable that the groove depth D8 (shown in FIG. 2) of the outer middle lug groove 27 is about 4.0 mm to about 7.0 mm.

Further, it is preferable that the groove width W8 of the outer middle lug groove 27 is gradually decreased toward the axially inside from the shoulder main grooves 3A. Such outer middle lug groove 27 can maintain the rigidity of an axially inner side of the middle land portion 4B and thereby it is possible to improve the steering stability.

It is preferable that the axial length L8 of the outer middle lug groove 27 is set to be not more than 50% of the maximum width W2b of the middle land portion 4B. Such outer middle lug groove 27 can prevent the middle land portion 4B from being decreased in the rigidity, and effectively improve the steering stability.

The length L8 of the outer middle lug groove 27 is more preferably not more then 48.0% of the maximum width W2b of middle land portion 4B. If the length L8 of the outer middle lug groove 27 is too small, there is a possibility that the drainage performance is deteriorated. Therefore, the length L8 of the outer middle lug groove 27 is preferably not less than 18%, more preferably not less than 20.0% of the maximum width W2b of the middle land portion 4B.

Further, it is preferable that, similarly to the shoulder lug groove 5 shown in FIG. 5, external corners (not shown) of the outer middle lug groove 27 between the groove walls (not shown) and the tread surface 2S in the middle land portion 4B are provided with chamfers (not shown). Such chamfer can prevent damage such as chipping likely to occur on the external corner and uneven wear of the middle land portion 4B.

In this embodiment, the outer middle lug grooves 27 include first outer middle lug grooves 27A, and second outer middle lug grooves 27B whose length L8 is greater than the first outer middle lug groove 27A.
The first outer middle lug grooves 27A and the second outer middle lug grooves 27B are arranged alternately in the tire circumferential direction.

Such outer middle lug grooves 27 prevent an excessive decrease in the rigidity of the middle land portion 4B by the first outer middle lug grooves 27A whose length L8 is relatively small, and can improve the steering stability. Further, it is also possible to improve the drainage performance of the middle land portion 4B by the second outer middle lug grooves 27B whose length L8 is relatively large. Moreover, as the first outer middle lug grooves 27A and the second outer middle lug grooves 27B are arranged alternately in the tire circumferential direction, the steering stability and the drainage performance are improved in good balance.

In order to effectively derive such effect, it is preferable that the length L8b of the second outer middle lug groove 27B is 180% to 280% of the length L8a of the first outer middle lug groove 27A.
If the length L8b of the second outer middle lug groove 27B is less than 180% of the length L8a the first outer middle lug grooves 27A, then it may not be possible to sufficiently improve the drainage performance. If the length L8b of the second outer middle lug groove 27B is more than 280% of the length L8a of the first outer middle lug groove 27A, then the rigidity of the middle land portion 4B is excessively decreased, and there is a possibility that the steering stability can not be improved sufficiently.
From this point of view, the length L8b of the second outer middle lug groove 27B is preferably not less than 200%, and preferably not more than 250% of the length L8a first outer middle lug groove 27A.

The first outer middle lug groove 27A is inclined with respect to the tire axial direction. The first outer middle lug groove 27A can smoothly discharge water film between the tread surface 2s in the middle land portion 4B and the road surface toward the shoulder main groove 3A along the inclination of the first outer middle lug groove 27A.
It is preferable that the angle α8a of the first outer middle lug groove 27A with respect to the tire axial direction is about 50 degrees to about 70 degrees.

The second outer middle lug groove 27B is inclined with respect to the axial direction of the tire, while gradually increasing its angle α8b with respect to the tire axial direction. The second outer middle lug groove 27B can smoothly discharge water film between the tread surface 2s in the middle land portion 4B and the road surface toward the shoulder main groove 3A along the inclination of the second outer middle lug groove 27B.
It is preferable that the angle α8b of the second outer middle lug groove 27B is about 50 degrees to about 80 degrees.

It is desirable that the axially outer end 27Bo of the second outer middle lug groove 27B is provided with a raised portion 35 (shown in FIG. 2) protruding radially outwardly of the tire from the groove bottom. Such raised portion 35 can increase the rigidity of an axially outer side of the middle land portion 4B and helps to improve the steering stability.

The inner middle lug groove 28 is inclined with respect to the tire axial direction. Such inner middle lug groove 28 can smoothly discharge water film between the tread surface 2s in the middle land portion 4B and the road surface toward the center main groove 3B along the inclination of the inner middle lug groove 28.

It is preferable that the groove width W9 of the inner middle lug groove 28 is about 3.0% to about 5.0% of the tread width TW (shown in FIG. 1). Also, it is preferable that the groove depth D9 (shown in FIG. 2) of the inner middle lug groove 28 is about 5.0 mm to about 7.0 mm. In addition, the angle α9 of the inner middle lug groove 28 is preferably about 40 degrees to about 60 degrees.

It is preferable that the axial length L9 of the inner middle lug groove 28 is not more than 50% of the maximum width W2b of the middle land portion 4B. Similarly to the outer middle lug groove 27, such inner middle lug groove 28 can prevent the rigidity reduction of the middle land portion 4B, and can effectively improve the steering stability.

Furthermore, it is preferable that the length L9 of the inner middle lug groove 28 is set to be smaller than the axial length L8a of the first outer middle lug groove 27A and the axial length L8b of the second outer middle lug groove 27B. Accordingly, the middle land portion 4B can increase the rigidity of an axially inner side of the middle land portion 4B where the ground contact pressure becomes relatively high, and can improve the steering stability and the straight running stability performance.

The length L9 of the inner middle lug groove 28 is more preferably not more than 18% and more preferably not less than 10.0% of the maximum width W2b of the middle land portion 4B.

It is preferable that the total number of the inner middle lug grooves 28 is set to be smaller than the total number of the outer middle lug grooves 27. Thereby, the inner middle lug groove 28 can increase the rigidity of the middle land portion 4B relatively in an axially inner region of the middle land portion 4B, and can improve the steering stability and the straight running stability performance.

Incidentally, it is preferable that the total number of the inner middle lug grooves 28 is about ⅖ to about ⅗ (in this embodiment, ½) of the total number of the outer middle lug grooves 27.

The middle sipe 30 in this embodiment extends in the tire circumferential direction in the area between the outer middle lug groove 27 and the inner middle lug groove 28. Such middle sipe 30 can increase the edge component with respect to the tire axial direction, and helps to improve the steering stability. Further, in the area between the outer middle lug groove 27 and the inner middle lug groove 28, the middle sipe 30 can allow the middle land portion 4B to deform flexibly. Thereby, the middle sipe 30 can reduce the rigidity difference in the tire axial direction of the middle land portion 4B, and increase the followability to road surface of the middle land portion 4B. Therefore, the middle sipe 30 can improve the uneven wear resistance, the wear resistance, and the ride comfort.

One end in the tire circumferential direction of the middle sipe 30 is connected to the axially inner end 27Bi of the second outer middle lug groove 27B. Thereby, the middle sipe 30 can mitigate the rigidity of the middle land portion 4B continuously from the inner end 27Bi of the second outer middle lug groove 27B. Therefore, the middle land portion 4B can be flexibly deformed in an axially outer side of the middle land portion 4B where the ground pressure becomes relatively small, and can improve the uneven wear resistance, the wear resistance and the ride comfort.

Preferably, the depth (not shown) of the middle sipe 30 is 1.5 mm to 5.0 mm.

The other end in the tire circumferential direction of the middle sipe 30 is provided with a bulge portion 31 in which the width of the middle sipe 30 increases.

The bulge portion 31 in this embodiment is disposed axially inside the second outer middle lug groove 27B.

Further, the bulge portion 31 is formed in a circumferentially long elliptical shape in which its maximum length L10 in the tire circumferential direction is larger than its maximum width W10 in the tire axial direction.

Similarly to the bulge portion 21 in the shoulder land portion 4A (shown in FIG. 4), such bulge portion 31 can effectively reduce the rigidity of the middle land portion 4B, and helps to improve the followability to road surface of the middle land portion 4B.

Therefore, the bulge portion 31 can improve the uneven wear resistance, the wear resistance, and the ride comfort. In order to effectively derive such effect, it is preferred that the maximum width W10 of the bulge portion 31 is in the same range as that for the maximum width W7 of the bulge portion 21 (shown in FIG. 4).

Further, it is preferred that the maximum length L10 of the bulge portion 31 is in the same range as that for the maximum length L7 of the bulge portion 21 (shown in FIG. 4).

Furthermore, it is preferred that the depth (not shown) of the bulge portion 31 is in the same range as that for the depth of the bulge portion 21 (shown in FIG. 4).

The middle sipe 30 extends toward the bulge portion 31 from the inner end 27Bi of the second outer middle lug groove 27B, while smoothly curving and gradually increasing its angle α11 with respect to the tire axial direction.

Between the inner end 27Bi of the second outer middle lug grooves 27B and the bulge portion 31, such middle sipe 30 can smoothen the rigidity variation of the middle land portion 4B, and can improve the steering stability.

It is preferable that the angle α11 of the middle sipe 30 is 60 degrees to 90 degrees.

As shown in FIG. 1, the center land portion 4c is formed as a straight rib extending straight in the tire circumferential direction. Such center land portion 4c can increase the circumferential rigidity, and helps to improve the straight running stability performance and the steering stability.

It is preferred that the maximum width W2c in the tire axial direction of the center land portion 4C is about 8.0% to about 12.0% of the tread width TW.

Figure 7:
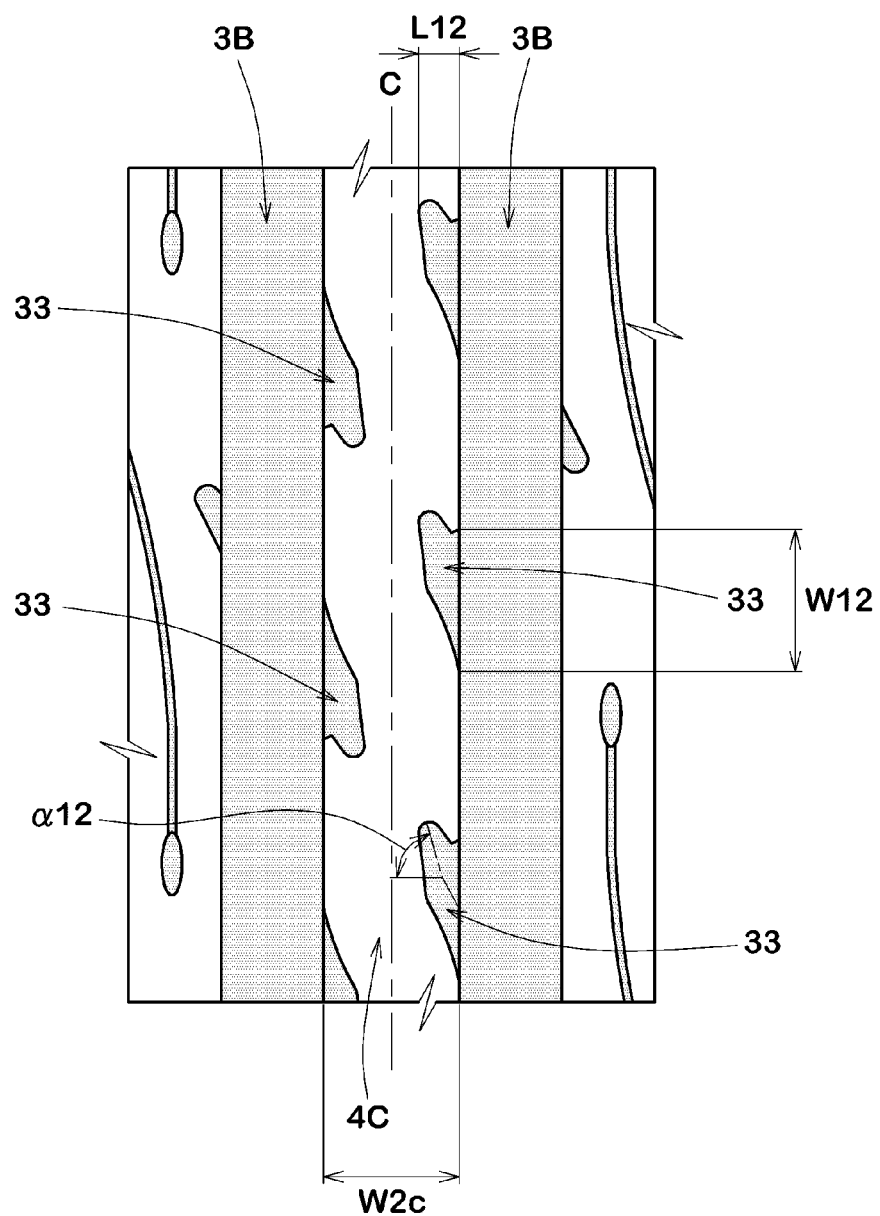
FIG. 7 a developed view enlargedly showing a center land portion

FIG. 7 is a developed view enlargedly showing the center land portion 4C.

The center land portion 4C is provided with center lug grooves 33 extending toward the axial inside from the center main groove 3B, and terminating without reaching the tire equator C.

The center lug groove 33 in this embodiment is inclined with respect to the tire axial direction.

Such center lug grooves 33 can smoothly discharge water film between the tread surface 2s in the center land portion 4c and the road surface toward the center main groove 3B along the inclination of the center lug groove 33, while preventing the rigidity reduction of the center land portion 4C. Therefore, the center lug groove 33 helps to improve the straight running stability performance and the drainage performance.

It is preferable that the groove width W12 of the center lug groove 33 is about 7.0% to about 9.0% of the tread width TW (shown in FIG. 1).

Further, it is preferable that the groove depth D12 (shown in FIG. 2) of the center lug groove 33 is about 5.0 mm to about 7.0 mm.

Further, it is preferable that the angle $\alpha 12$ of center lug groove 33 is 50 degrees to 70 degrees.

It is preferable that the groove width W12 of the center lug groove 33 is gradually decreased toward the axially inside from the center main groove 3B. Such center lug groove 33 can prevent the rigidity of an axially inner side of the center land portion 4C from being decreased, and can improve the straight running stability performance.

Further, it is preferable that, similarly to the shoulder lug groove 5 shown in FIG. 5, external corners (not shown) between the groove walls (not shown) of the center lug groove 33 and the tread surface 2s in the center land portion 4C are provided with chamfers (not shown). Such chamfers can prevent damage such as chipping likely to occur in the corners and uneven wear of the center land portion 4c.

It is desirable that the axial length L12 of the center lug groove 33 is set to be not more than 50% of the maximum width W2c of the center land portion 4C. Such center lug groove 33 can prevent the rigidity reduction of the center land portion 4C, and improve the steering stability.

The length L12 of the center lug groove 33 is preferably not more than 40%, and preferably not less than 20% of the maximum width W2c of the center land portion 4c.

While detailed description has been made of an especially preferable embodiment of the present invention, the present invention can be embodied in various forms without being limited to the illustrated embodiment

WORKING EXAMPLES

Tires having the basic structure shown in FIG. 1 and having first shoulder sipes, second shoulder sipes and lug grooves shown in Table 1 were manufactured, and they were tested. For comparison, tires (Comparative Example 1, comparative Example 2 and comparative Example 3) not having the first shoulder sipes or the second shoulder sipes were manufactured, and tested in like wise.

The common specifications are as follows.
Tire size: 195/65R15 91H
Rim size: 15×6.07
Internal pressure (internal pressure specified for vehicle):
   front wheel: 230 kPa, rear wheel: 220 kPa
Vehicle: Prius manufactured by Toyota Motor Co., Ltd.
Tread width TW: 150 mm
Shoulder main groove:
   groove width W1a/TW: 10.1%, groove depth D1a: 8.2 mm
Center main groove:
   groove width W1b/TW: 13.5%, groove depth D1b: 8.2 mm
   chamfer:
     angle $\alpha 4a$: 45 degrees, width W4a: 0.8 mm
Shoulder land portion:
   maximum width W2a/TW: 21.3%
   shoulder lug groove:
     groove width W3/TW: 3.0 to 7.8%, groove depth D3: 8.2 mm
     angle $\alpha 3$ in inner part: 5 to 10 degrees
     length L6 between second shoulder lug grooves: 62.0 mm
   Chamfer:
     angle $\alpha 4b$: 45 degrees, width W4b: 0.5 mm
First shoulder sipe:
   depth: 5.6 mm, angle $\alpha 5a$: 10 to 30 degrees
Second shoulder sipe:
   depth: 1.0 mm
   bulge portion:
     maximum length L7: 1.4 mm, maximum width W7: 5.4 mm depth: 1.2 mm
Middle land portion:
   maximum width W2b/TW: 15.7%
   outer middle lug groove:
     groove width W8/TW: 3.0%, groove depth D8: 5.8 mm
     first outer middle lug groove angle $\alpha 8a$: 60 degrees
     second outer middle lug groove angle $\alpha 8b$: 50 to 70 degrees
   inner middle lug groove:
     groove width W9/TW: 3.9%, groove depth D9: 5.8 mm
     angle $\alpha 9$: 50 degrees
   middle sipe:
     depth: 2.0 mm to 4.0 mm, angle $\alpha 11$: 70 to 90 degrees
   bulge portion:
     maximum length L10: 1.4 mm, maximum width W10: 5.4 mm depth: 1.0 mm
Center land portion:
   maximum width W2c/TW: 10.0%
   center lug groove:
     groove width W12/TW: 7.9%, groove depth D12: 5.8 mm
     angle $\alpha 12$: 60 degrees
Test methods are as follows.
<Steering Stability>

Each test tire mounted on the above-mentioned rim and inflated to the above-mentioned internal pressure was attached to four wheels of the vehicle. Then, it was run on a dry asphalt road surface of a test course with two people riding thereon, and the driver sensory evaluated characteristics relating to handle response, rigidity feeling, grip and the like. The results of the evaluation are indicated by an index based on comparative example 1 being 100. The larger value is better.

<Ride Comfort>

Each test tire mounted on the above-mentioned rim and inflated to the above-mentioned internal pressure was attached to four wheels of the vehicle. Then, it was run on test courses such as stepped road with dry asphalt road surface, belgian road (stone-paved road), and bitumen road (road surface paved with pebbles), with two people riding thereon, and the driver sensory evaluated rugged feeling, push-up, and damping.

The results of the evaluation are indicated by an index based on comparative example 1 being 100. The larger value is better.

<Wear Resistance>

Each test tire mounted on the above-mentioned rim and inflated to the above-mentioned internal pressure was attached to four wheels of the vehicle. Then, it was run for 340 km on express highway and general road (including city streets, mountain road) with two people riding thereon. Then, at three block-like portions on the circumference of the tire in the shoulder land portion, the wear index (mileage/wear amount) was measured, and the average value was calculated. The results of the evaluation are indicated by an index based on comparative example 1 being 100. The larger value is better.

<Uneven Wear Resistance>

Each test tire mounted on the above-mentioned rim and inflated to the above-mentioned internal pressure was attached to four wheels of the vehicle. Then, it was run for 8000 km on express highway and general road (including city streets, mountain roads) with two people riding thereon. Then, at four positions on the circumference of the tire in a tread edge side, it was checked whether uneven wear (heel & toe wear) existed or not, based on the ratio (V1/V2) of the amount V1 of wear of a block-like portion in the shoulder land portion on its toe side and the amount V2 of wear of the block-like portion on its heel side. If the ratio (V1/V2) is 0.5 or less, or 1.5 or more, it was judged that the uneven wear was occurred.

The results of the tests are shown in Table 1.

TABLE 1

|  | comparative example 1 | comparative example 2 | comparative example 3 | working example 1 | working example 2 | working example 3 | working example 4 |
| --- | --- | --- | --- | --- | --- | --- | --- |
| presence or absence of first shoulder sipe | absence | presence | absence | presence | presence | presence | presence |
| presence or absence of second shoulder sipe | absence | absence | presence | presence | presence | presence | presence |
| presence or absence of bulge portion of second shoulder sipe | absence | absence | absence | absence | absence | absence | presence |
| circumferential length of first part of second shoulder sipe L5b/L6 (%) | — | — | 90.4 | 90.4 | 80.0 | 95.0 | 90.4 |
| presence or absence of third shoulder sipe | absence | absence | absence | absence | absence | absence | absence |
| angle a3 of outer part of second shoulder lug groove | 15.0 | 15.0 | 15.0 | 15.0 | 15.0 | 15.0 | 15.0 |
| first outer middle lug groove length L8a/W2b (%) | 55.0 | 55.0 | 55.0 | 55.0 | 55.0 | 55.0 | 55.0 |
| second outer middle lug groove length L8b/W2b (%) | 70.0 | 70.0 | 70.0 | 70.0 | 70.0 | 70.0 | 70.0 |
| inner middle lug groove length L9/W2b (%) | 52.0 | 52.0 | 52.0 | 52.0 | 52.0 | 52.0 | 52.0 |
| center lug groove length L12/W2c (%) | 60.0 | 60.0 | 60.0 | 60.0 | 60.0 | 60.0 | 60.0 |
| presence or absence of chamfer of shoulder lug groove | absence | absence | absence | absence | absence | absence | absence |
| presence or absence of middle sipe | absence | absence | absence | absence | absence | absence | absence |
| presence or absence of bulge portion of middle sipe | absence | absence | absence | absence | absence | absence | absence |
| steering stability (index) <larger is better> | 100 | 100 | 100 | 100 | 100 | 95 | 100 |
| ride comfort (index) <larger is better> | 100 | 105 | 105 | 115 | 110 | 115 | 117 |
| wear resistance (index) <larger is better> | 100 | 102 | 102 | 105 | 103 | 105 | 110 |
| uneven wear resistance (presence or absence of H/T wear) | presence | presence | presence | absence | absence | absence | absence |

|  | working example 5 | working example 6 | working example 7 | working example 8 | working example 9 | working example 10 |
| --- | --- | --- | --- | --- | --- | --- |
| presence or absence of first shoulder sipe | presence | presence | presence | presence | presence | presence |
| presence or absence of second shoulder sipe | presence | presence | presence | presence | presence | presence |
| presence or absence of bulge portion of second shoulder sipe | presence | presence | presence | presence | presence | presence |
| circumferential length of first part of second shoulder sipe L5b/L6 (%) | 90.4 | 90.4 | 90.4 | 90.4 | 90.4 | 90.4 |
| presence or absence of third shoulder sipe | presence | presence | presence | presence | presence | presence |
| angle a3 of outer part of second shoulder lug groove | 15.0 | 0.0 | 0.0 | 0.0 | 0.0 | 0.0 |
| first outer middle lug groove length L8a/W2b (%) | 55.0 | 55.0 | 20.0 | 20.0 | 20.0 | 20.0 |
| second outer middle lug groove length L8b/W2b (%) | 70.0 | 70.0 | 46.7 | 46.7 | 46.7 | 46.7 |
| inner middle lug groove length L9/W2b (%) | 52.0 | 52.0 | 13.3 | 13.3 | 13.3 | 13.3 |
| center lug groove length L12/W2c (%) | 60.0 | 60.0 | 30.0 | 30.0 | 30.0 | 30.0 |
| presence or absence of chamfer of shoulder lug groove | absence | absence | absence | presence | presence | presence |
| presence or absence of middle sipe | absence | absence | absence | absence | presence | presence |
| presence or absence of bulge portion of middle sipe | absence | absence | absence | absence | absence | presence |
| steering stability (index) <larger is better> | 100 | 115 | 130 | 130 | 130 | 130 |

TABLE 1-continued

|  |  |  |  |  |  |  |
|---|---|---|---|---|---|---|
| ride comfort (index) <larger is better> | 120 | 115 | 115 | 110 | 120 | 125 |
| wear resistance (index) <larger is better> | 120 | 120 | 120 | 130 | 135 | 140 |
| uneven wear resistance (presence or absence of H/T wear) | absence | absence | absence | absence | absence | absence |

From the test results, it was confirmed that the working Example tires were improved in the uneven wear resistance, while maintaining the steering stability.

DESCRIPTION OF THE SIGNS 2 tread portion
3A shoulder main grooves
4A shoulder land portion
5 shoulder lug groove
5A first shoulder lug groove
6 shoulder sipe
6A first shoulder lug groove
6B second shoulder lug groove

The invention claimed is:

1. A pneumatic tire comprising:
a tread portion provided with a pair of axially outermost shoulder main grooves extending continuously in the tire circumferential direction to define a pair of shoulder land portions between the shoulder main grooves and tread edges, wherein:
at least one of the shoulder land portions is provided with a plurality of shoulder lug grooves and a plurality of shoulder sipes, wherein:
the shoulder lug grooves extend axially inwardly from the tread edge, and terminate without reaching the shoulder main groove so that each of the shoulder lug grooves has an axially inner end,
the shoulder lug grooves include first shoulder lug grooves and second shoulder lug grooves arranged to be alternating in the tire circumferential direction,
the shoulder sipes include first shoulder sipes and second shoulder sipes,
the first shoulder sipes extend axially inwardly from the respective axially inner ends of the first shoulder lug grooves to the shoulder main groove, and
the second shoulder sipes extend axially inwardly from the respective axially inner ends of the second shoulder lug grooves and turn to one tire circumferential direction, without reaching the shoulder main groove, and then extend in the tire circumferential direction to respectively intersect with the adjacent first shoulder sipes, and then further extend in the tire circumferential direction to terminate without reaching the respective next second shoulder sipes so that each of the second shoulder sipes has a closed circumstantial end.

2. The pneumatic tire as set forth in claim 1, wherein:
each of the circumstantial ends of the second shoulder sipes is provided with a bulge portion in which the second shoulder sipe is increased in the width.

3. The pneumatic tire as set forth in claim 1, wherein:
external corners between groove walls of the shoulder lug grooves and a tread surface in the shoulder land portion are provided with chamfers.

4. The pneumatic tire as set forth in claim 2, wherein:
the shoulder sipes include third shoulder sipes disposed between the first shoulder lug grooves and the second shoulder lug grooves, and extending axially inwardly from the tread edge to terminate without reaching the second shoulder sipes, and
the third should sipes have a constant width from the tread edge to the axially inner ends thereof to have no bulge portions.

5. The pneumatic tire as set forth in claim 2, wherein:
external corners between groove walls of the shoulder lug grooves and a tread surface in the shoulder land portion are provided with chamfers.

6. The pneumatic tire as set forth in claim 2, wherein:
the bulge portion is oval in its top view.

* * * * *